US011380138B2

(12) United States Patent
Yang et al.

(10) Patent No.: US 11,380,138 B2
(45) Date of Patent: Jul. 5, 2022

(54) DEVICE AND METHOD FOR TOUCHLESS PALM PRINT ACQUISITION

(71) Applicant: REDROCK BIOMETRICS INC, San Francisco, CA (US)

(72) Inventors: Hua Yang, Millbrae, CA (US); Leonid Kontsevich, San Francisco, CA (US)

(73) Assignee: REDROCK BIOMETRICS, INC., San Francisco, CA (US)

( * ) Notice: Subject to any disclaimer, the term of this patent is extended or adjusted under 35 U.S.C. 154(b) by 0 days.

(21) Appl. No.: 16/954,202

(22) PCT Filed: Dec. 14, 2018

(86) PCT No.: PCT/CN2018/121087
§ 371 (c)(1),
(2) Date: Jun. 15, 2020

(87) PCT Pub. No.: WO2019/114814
PCT Pub. Date: Jun. 20, 2019

(65) Prior Publication Data
US 2020/0320321 A1    Oct. 8, 2020

(30) Foreign Application Priority Data
Dec. 14, 2017 (CN) .......................... 201711341534.0

(51) Int. Cl.
*G06V 40/60* (2022.01)
*G06V 10/141* (2022.01)
(Continued)

(52) U.S. Cl.
CPC ............ *G06V 40/67* (2022.01); *G06V 10/141* (2022.01); *G06V 40/1312* (2022.01);
(Continued)

(58) Field of Classification Search
CPC ............ G06K 9/00912; G06K 9/00033; G06K 9/0004; G06K 9/00255; G06K 9/00604;
(Continued)

(56) References Cited

U.S. PATENT DOCUMENTS 8,027,518 B2   9/2011   Baker et al.
8,229,178 B2   7/2012   Zhang et al.
(Continued)

FOREIGN PATENT DOCUMENTS

EP       0081276 A2    6/1983

OTHER PUBLICATIONS

"Fujitsu Laboratories Develops Technology for World's First Contact-less Palm Vein Pattern Biometric Authentication System", Mar. 31, 2003, 2 pages.
(Continued)

*Primary Examiner* — John B Strege
(74) *Attorney, Agent, or Firm* — Brad Bertoglio; Intelink Law Group, P.C.

(57) ABSTRACT

The present invention describes a device and method for touchless palmprint acquisition. The method can be applied to a terminal device (including but not limited to mobile phones, tablet computers and other portable devices) with a display screen and a front-facing camera. The camera is used to capture images of palms. The screen is used as a supplementary light source. When lighting condition in the palm area is undesirable, the screen changes its display to improve the lighting condition inside the palm, which increases the recognizability of the palmprint. The palmprint acquisition device and method described in the present invention can be directly applied to existing terminal devices without requiring any additional hardware. By adopting a variety of ways to change the display of the built-in screen of the terminal device, the lighting condition of the palm area will be
(Continued)

improved and the recognizability of the palmprint will be increased.

13 Claims, 4 Drawing Sheets

(51) Int. Cl.
*G06V 40/19* (2022.01)
*G06V 40/16* (2022.01)
*G06V 40/13* (2022.01)

(52) U.S. Cl.
CPC ........ *G06V 40/1318* (2022.01); *G06V 40/166* (2022.01); *G06V 40/19* (2022.01); *G06V 40/63* (2022.01)

(58) Field of Classification Search
CPC ............. G06K 9/00919; G06K 9/2027; G06K 9/00006; G06K 9/00087; G06K 9/00926
See application file for complete search history.

(56) References Cited

U.S. PATENT DOCUMENTS

| | | | | |
|---|---|---|---|---|
| 8,538,088 B2* | 9/2013 | Hama | ................ | G06K 9/00382 |
| | | | | 382/115 |
| 8,749,538 B2* | 6/2014 | Webster | ............... | G09G 3/3466 |
| | | | | 345/207 |
| 9,153,074 B2 | 10/2015 | Zhou et al. | | |
| 9,390,630 B2 | 7/2016 | Daniels | | |
| 9,485,398 B2* | 11/2016 | Patel | ........................ | H04N 5/20 |
| 9,594,891 B2 | 3/2017 | Iwata | | |
| 9,635,255 B1* | 4/2017 | Baldwin | .............. | H04N 5/2354 |
| 9,659,205 B2* | 5/2017 | Demos | ............... | G06K 9/00892 |
| 9,928,399 B2* | 3/2018 | Chi | .................... | G06K 9/00087 |
| 10,282,579 B2* | 5/2019 | Thompson | ............ | G06F 1/3287 |
| 10,449,902 B1* | 10/2019 | Englander | ................ | B60R 1/12 |
| 2004/0264742 A1 | 12/2004 | Zhang et al. | | |
| 2011/0213664 A1 | 9/2011 | Osterhout et al. | | |
| 2012/0253607 A1 | 10/2012 | Choi | | |
| 2013/0127980 A1 | 5/2013 | Haddick et al. | | |
| 2013/0312090 A1 | 11/2013 | Sahin et al. | | |
| 2014/0036168 A1* | 2/2014 | Ludwig | ................. | H01L 27/323 |
| | | | | 349/12 |
| 2014/0063055 A1 | 3/2014 | Osterhout et al. | | |
| 2014/0068740 A1 | 3/2014 | LeCun et al. | | |
| 2014/0282271 A1 | 9/2014 | Lu et al. | | |
| 2015/0002735 A1* | 1/2015 | Moskovchenko | ..... | H04N 7/142 |
| | | | | 348/370 |
| 2015/0020181 A1* | 1/2015 | Iwata | ................... | G06K 9/4652 |
| | | | | 726/7 |
| 2015/0186708 A1 | 7/2015 | Katz | | |
| 2015/0264339 A1 | 9/2015 | Riedel | | |
| 2016/0034747 A1* | 2/2016 | Jo | .......................... | G06F 3/012 |
| | | | | 382/118 |
| 2016/0091975 A1 | 3/2016 | Kumar et al. | | |
| 2016/0092726 A1 | 3/2016 | Li et al. | | |
| 2016/0140766 A1 | 5/2016 | Balachandreswaran et al. | | |
| 2016/0205238 A1* | 7/2016 | Abramson | ........... | G08G 1/0137 |
| | | | | 455/456.4 |
| 2016/0224123 A1 | 8/2016 | Antoniac et al. | | |
| 2016/0224816 A1* | 8/2016 | Smith | .................. | G06K 9/0004 |
| 2016/0283770 A1* | 9/2016 | Chi | ........................ | G06K 9/036 |
| 2016/0290764 A1 | 10/2016 | Mathew et al. | | |
| 2017/0017824 A1* | 1/2017 | Smith | .................... | G02B 6/005 |
| 2017/0140547 A1 | 5/2017 | Tsurumi | | |
| 2017/0164446 A1* | 6/2017 | Tan | ...................... | H05B 47/105 |
| 2017/0353689 A1* | 12/2017 | Choe | ........................ | H04N 5/58 |
| 2018/0068160 A1* | 3/2018 | Wu | .................... | G06K 9/00201 |
| 2018/0211633 A1* | 7/2018 | Peng | ........................ | G09G 5/10 |
| 2021/0118404 A1* | 4/2021 | Bartscherer | .......... | H04N 5/2354 |

OTHER PUBLICATIONS

Aoyama, Shoichiro, et al., "A Contactless Palmprint Recognition Algorithm for Mobile Phones", 2013. 5 pages.
Jain, Anil K., et al., "A Prototype Hand Geometry-based Verification System", Mar. 22-24, 1999, 6 pages.
Zhen Yu et al., "An exploration of usable authentication mechanisms for virtual reality systems" (Abstract), 2016 IEEE Asia Pacific Conference on Circuits and Systems (Oct. 25-28, 2016).
Canny edge detector, https://en.wikipedia.orglwiki/CannLedge_detector, downloaded Jun. 1, 2017, 6 pages.
Corner Detection, https://enwikipedia.org/wiki/Corner_detection, downloaded May 30, 2017, 8 pages.
Features from accelerated segment test, https://enwikipedia.org/wiki/Features_from_accelerated_segment_test, downloaded May 30, 2017, 6 pages.
Random Sample Consensus (RANSAC), https://en.wikipedia.orglwiki/Random_sample_consensus, downloaded May 30, 2017, 10 pages.
Scale-invariant feature transform, https://en.wikipedia.orglwiki/Scale-invariant_feature_transform, downloaded May 30, 2017, 18 pages.
Frangi et al. "Multiscale vessel enhancement filtering," MICCAI '98, v. 1496, Springer Verglag, Berlin, Germany, Oct. 11, 1998, pp. 130-137.
Harris et al., "A combined corner and edge detector," In Proc. of Fourth Alvey Vision Conference Aug. 31-Sep. 2, 1988 6 pages.
File:CIExyl931.png, found at https://commons.wikimedia.org/wiki/File:CIExyl931.png, downloaded Jun. 5, 2017, 4 pages.
Khatkar et al., "Biomedical Image Enhancement Using Wavelets," International Conference on Computer, Communication and Convergence, Dec. 17-28, 2014, Procedia Computer Science 48 (2015) 513-517.
Krujatz et al., "Exploiting the Potential of OLED-Based Photo-Organic Sensors for Biotechnological Applications," Chem Sci J 2016, 7:3, Sep. 2016, 10 pages.
Lowe, "Object recognition from local scale-invariant features," Proceedings of the Seventh IEEE International Conference on Computer Vision, v2. Kerkyra, Sep. 20-27, 1999, pp. 1150-1157.
Rosten et al., "Faster and Better: A Machine Learning Approach to Corner Detection," in IEEE Transactions on Pattern Analysis and Machine Intelligence, vol. 32, No. 1, pp. 105-119, Jan. 2010.
Ku, X, et al., "Multispectral Palm print Recognition Using a Quaternion Matrix," Sensors 2012, 12, Apr. 10, 2012, 633-4647.

* cited by examiner

DEVICE AND METHOD FOR TOUCHLESS PALM PRINT ACQUISITION

TECHNICAL FIELD

The present disclosure relates in general to biometric authentication, and in particular to capturing palmprint images for touchless biometric authentication.

BACKGROUND

Biometric as a cross-discipline that combines bioinformatics and computer technology has gained increasing popularity in recent years. Biometric technology refers to the use of the inherent physical characteristics of the human body such as sound, fingerprints, iris, eye pattern, face etc., or behavioral characteristics such as signatures, gait, etc., as a personalized representation to identify a person. Compared with the traditional identity representations such as keys, ID cards, and passwords, biometrics has the advantages of being hard to lose, difficult to forge, and easy to use. With the rapid development of computer technology in recent years, integrating computer technology into biometrics applications has become a research hotspot in the field of biometrics.

Among the many biometrics, palmprint recognition is a new biometric method that has emerged in recent years. Compared with other biometrics, palmprint recognition has the following advantages:

(1) Face recognition requires good illumination. Moreover, changes in facial expressions and makeup will lead to high false acceptance rate and false rejection rate. Face recognition can also have security issues where people with similar appearance can pass recognition. Palmprint recognition, on the other hand, is insensitive to variances in lighting, facial expressions, makeup, etc. and has lower false acceptance rate and false rejection rate. The palmprint of each individual is unique, even for identical twins. Palmprint recognition can effectively address security issues caused by confusing people with similar appearance;

(2) Iris and eye pattern recognitions are the most commonly shown biometric technologies in movies. While their recognition accuracy is usually high, these technologies require expensive hardware and only work well in controlled environments. As a comparison, the acquisition of palm prints has lower requirements on environment (such as light intensity). Unlike iris and eye pattern recognitions, the use of strong light during the palmprint acquisition process will not hurt the eyeball. This allows the control of lighting condition to be simpler and the cost of the acquisition equipment to be lower;

(3) Fingerprint recognition is the earliest biometric technology to be studied and applied. The technology is mature. However, the amount of identifiable information is limited by the small area of the fingertip. Moreover, the acquisition of fingerprints usually requires touching a high-resolution sensor. Since the palm has a much larger area than the fingers, palmprints contain much richer identifiable information, therefore the probability of replication is much lower. Moreover, a palm contains multiple major lines and other smaller creases that are very distinguishable and insensitive to image noise, from which point and line features can be reliably extracted. Therefore, palmprint recognition can be accomplished even with a low-resolution camera image with a relatively high noise level.

(4) Compared with behavior characteristics such as gait and signature, palmprint features are more stable and unique, and the recognition accuracy is much higher.

Based on the acquisition method, biometric technology can be divided into two categories: contact and touchless. Contact refers to the process of biometric acquisition where a part of the human body needs to directly contact with a sensor of the identification device to acquire the biometric information used for recognition. Touchless means that biometrics, such as iris, eye pattern, face etc., can be acquired, extracted, and recognized without any direct contact between the human body and the identification device. Touchless biometrics technology has become the mainstream research direction in the field of biometrics due to its broad application scenarios, flexible identification process, and hygiene.

To ensure the accuracy of the captured features inside the palm area, most palmprint recognition technologies today use contact-based scanners, which not only raises the concern on hygiene in public spaces, but also compromises other competitive advantages of palmprint recognition such as low requirements on working environment, low equipment cost, high recognition accuracy and fast recognition speed etc. On the other hand, when using a camera to capture palmprint images touchless, natural light or yellowish or reddish light may affect the contrast of the palmprint image, which limits the application of palmprint recognition to some extent.

In summary, there is a demand on a new palmprint acquisition method that can capture palmprint through a touchless process that further reduces the requirements on hardware and working environment while ensures a higher palmprint recognizability.

SUMMARY

To address the above issues, the first aspect of the present invention provides a touchless palmprint acquisition method, which can be applied to a terminal device with a screen and a front-facing camera. The acquisition process comprises a number of steps: the front-facing camera acquires the palmprint image, the screen emits light and serves as a supplementary light source, when the illumination is undesirable, the screen changes its display to change the lighting condition in the palm area in order to increase the recognizability of the palmprint. The method of changing the screen display is one or multiple of the following:

(1) Increase the brightness level of the screen;
(2) Display a high-brightness background; and/or
(3) Display a blue or purple background.

In some embodiment, real-time feedback is displayed on the screen of the terminal device to guide the user to place the palm in a suitable position.

In another embodiment, one or multiple of the following methods is used to determine whether the lighting condition is undesirable:

(a) The terminal device is equipped with an ambient light sensor, which is used to measure the light intensity of the environment, and when the intensity is lower than or equal to a first preset value, it is determined that the lighting condition is undesirable;

(b) The grayscale intensity of the image in the palm area is analyzed, and when the intensity is lower than or equal to a second preset value, it is determined that the lighting condition is undesirable;

(c) The contrast of the image in the palm area is analyzed, and when the contrast is lower than or equal to a third preset value, it is determined that the lighting condition is undesirable.

In another embodiment, a background is simultaneously displayed together with the real-time feedback but on different layers or in different areas of the screen.

In another embodiment, the real-time feedback is one or multiple of the following:

(i) A static visual cue for guiding the user to place the palm at a suitable position;

(ii) A real-time video displaying the whole or certain subarea of the video captured by the front-facing camera; and/or (iii) A dynamic visual cue for indicating whether the palm is detected, and if yes, the position and size of the detected palm, and/or the desired direction to move the palm.

In another embodiment, the static and/or dynamic visual cues each consists of arrows, wireframes, filled figures, and text.

In another embodiment, the static visual cue is in the background.

In another embodiment, a background and a real-time video are simultaneously displayed on the screen.

In another embodiment, the method further includes the logic of detecting whether the image captured by the camera includes a palm, and if so, locating the position of the palm in the image, and visualizing the palm area as a dynamic visual cue on the screen.

In another embodiment, the background is set to be translucent and placed in front of the real-time video.

In another embodiment, the background and the real-time video are displayed in different areas of the screen. The real-time video is displayed in an opening that is cut from the background.

In another embodiment, the boundary between the background and the real-time video is used as a static visual cue.

In another embodiment, the static and/or dynamic visual cues are located in the area of the background and/or the real-time video.

The second aspect of the present invention provides a touchless facial image acquisition method, in which the palm in the touchless palmprint acquisition method presented above is replace with a human face.

The third aspect of the present invention provides a touchless eye pattern acquisition method, in which the palm in the touchless palmprint acquisition method presented above is replace with an eye.

The fourth aspect of the present invention provides a touchless palmprint acquisition device, which includes a terminal device with a screen and a front-facing camera, wherein the front-facing camera is used to capture palmprint images, and the screen will change its display such that, when the lighting is undesirable, the light from the screen can improve the lighting condition in the palm area in order to improve the recognizability of the palmprint; wherein the method of changing the screen display is one or multiple of the following:

(1) Increase the brightness level of the screen;
(2) Display a high-brightness background; and/or
(3) Display a blue or purple background.

In another embodiment, the touchless palmprint acquisition device further includes a distance sensor that can measure the distance between the palm and the front-facing camera.

Compared with the prior art, the present invention has the following advantages:

(1) The palmprint acquisition method of the present invention can be directly applied to existing terminal devices, such as personal mobile devices, to implement palmprint detection, acquisition, recognition, matching and feedback, all using the built-in screen, camera, ambient light sensor, distance sensors, processor chips etc. of the terminal device, without the need of additional hardware, which greatly expands the field and scope of palmprint recognition applications;

(2) The palmprint acquisition method of the present invention is different from the conventional photo beautification. Instead of using objective functions such as image softness to beautify the captured palmprint images, the goal is to acquire palmprint information with sufficient recognizable biological features;

(3) In the palmprint acquisition method of the present invention, the screen can change its display in a variety of ways. The light from the screen then changes the lighting condition of the palm area in order to improve the recognizability of the palmprint;

(4) The palmprint acquisition method of the present invention also facilitates a better human-computer interaction. The screen has areas to display the palm image captured by the front-facing camera in real time, as well as static and/or dynamic visual cues to guide the user to adjust palm position, distance or posture.

(5) On the premise of ensuring recognition accuracy, the screen display can be used both as a light source and as a guidance for palm positioning. In the prior art that uses the display as fill light, the display usually stops displaying videos or instructions during light filling and instead displays a full screen highlight (or bright white), which prevents the user from getting feedback or guidance during the light filling process;

(6) The palmprint acquisition method of the present invention makes the identification process more efficient, easier to operate, and lowers the requirements on the working environment. It is applicable to not only authentication and identification on a personal mobile device, but also to multi-person authentication on a terminal in public places.

DETAILED DESCRIPTION OF THE DRAWINGS

Figure 1:
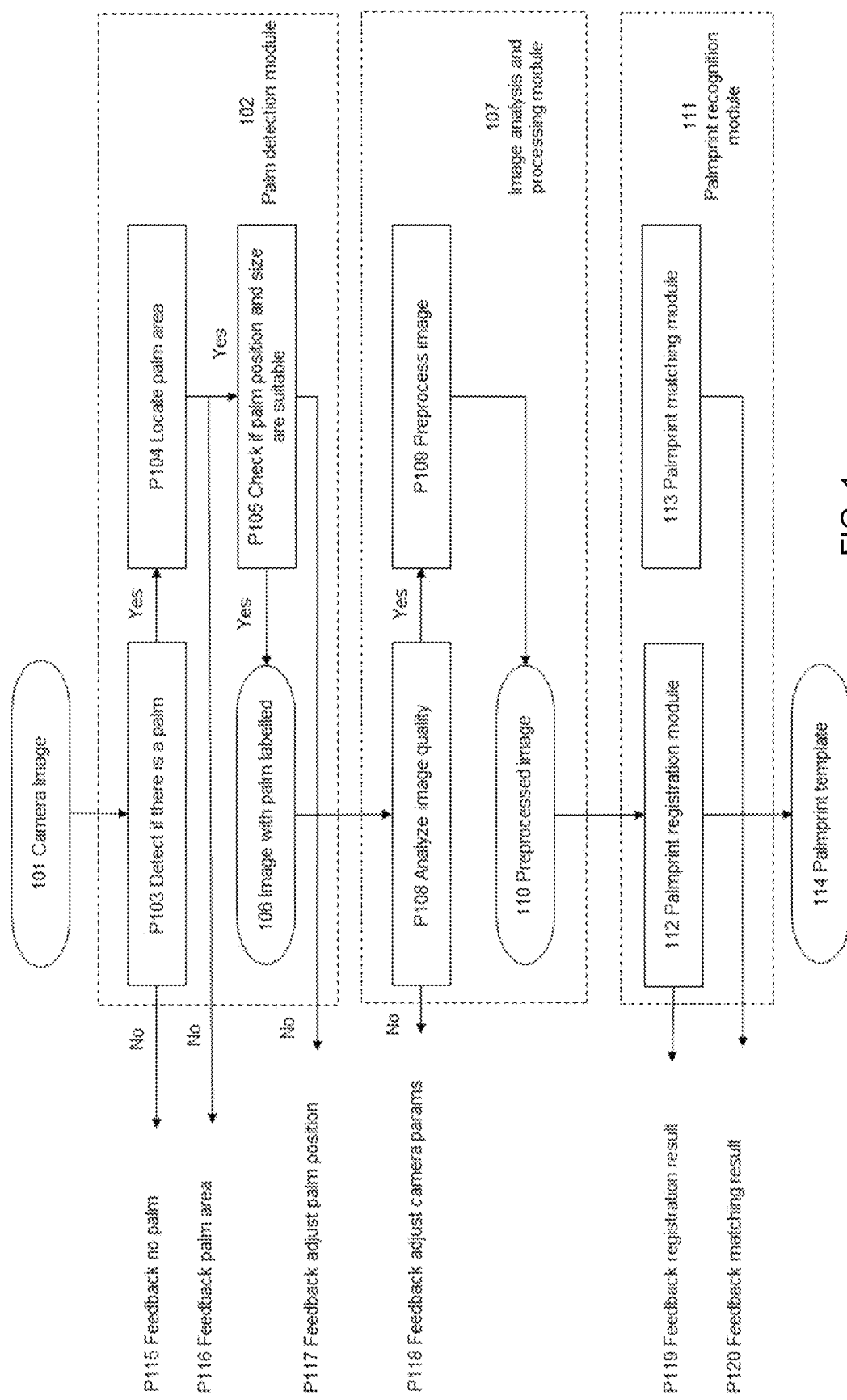
FIG. 1 shows a flow chart of touchless palmprint recognition using the presented palmprint acquisition method.

The specific embodiments of the present invention are described in detail below with reference to the drawings. However, it should be understood that the present invention is not limited to such embodiments described below, and the technical idea of the present invention can be implemented in combination with other well-known technologies or other technologies having the same functions as those of well-known technologies.

In the description of the following specific embodiments, in order to clearly show the structure and working mode of the present invention, many descriptions involve directional words such as "front", "back", "left", "right", "outer" " ", "inner", "outward", "inward", "axial", "radial" etc. These directional should be understood as convenient terms, and should not be understood as limiting words.

Explanation of Terms

High-brightness background: refers to a background with a certain brightness, i.e., the brightness of the screen display that is sufficient to illuminate the palm area for palm image acquisition. In the present invention, it can be achieved by increasing the brightness level of the screen and/or by displaying a high-brightness background on it. The high-brightness background described in the present invention can emit light that can improve the contrast of the palmprint image, such as blue light, violet light, or composite light containing blue and violet spectrums. In particular, the high-brightness background contains light having a wavelength between 400 nm and 480 nm. This high-brightness background facilitates the acquisition of high contrast palmprint instead of beautifying the image. This is fundamentally different from the prior art that uses a supplementary light source that is white, yellowish or reddish, etc.

First preset value: in the present invention, the first preset value refers to a preset light intensity value. When the ambient light intensity of the environment is lower than or equal to the first preset value, the lighting condition is regarded as undesirable. A person skilled in the art can select the first preset value according to the camera configuration of the terminal device and the ambient light intensity. Herein the present invention does not make special restrictions. For instance, assuming that the minimum light intensity required for palmprint recognition is 10 lux, and the light intensity of the environment is less than 10 lux, the brightness level of the display screen can be changed to increase the light intensity of the palm area to be above 10 lux in order to obtain a clear palmprint image. In another example, an ambient light sensor is used to determine whether the light intensity of the environment meets the demand. If not, a high-brightness background is displayed, and the brightness level of the screen can be adjusted at the same time or later.

Second preset value: in the present invention, the second preset value refers to a preset grayscale intensity value of the image. When the grayscale intensity of the palm area in the captured image is lower than or equal to the second preset value, the lighting condition is regarded as undesirable. The second preset value can be configured according to the target false rejection rate (FRR) and false acceptance rate (FAR) of palmprint recognition, the scene of palmprint acquisition, the chip specs of the terminal device, etc.

Third preset value: in the present invention, the third preset value refers to a preset image contrast value. When the contrast value of the palm area in the acquired image is lower than or equal to the third preset value, the lighting condition is regarded as undesirable. The contrast value measures the difference of the grayscale intensity between the brightest and the darkest regions in the palm area of the image. The larger the difference, the greater the contrast. The third preset value can be configured according to the false rejection rate (FRR) and false acceptance rate (FAR) of palmprint recognition, the scene of palmprint acquisition, the chip specs of the terminal device, etc.

Preferably, the comparison between the ambient light intensity of the environment and the first preset value, the grayscale intensity of the palm area in the image and the second preset value, the contrast value of the palm area in the image and the third preset value can be performed simultaneously. For example, the screen display can be changed when the grayscale intensity of the palm area is too low, or when the grayscale intensity is high enough but the contrast value is too low.

Real-time video: in the present invention, the real-time video is a sequence of images captured using the front-facing camera. The displayed part can be the whole image or certain subareas of the image. The video can be captured continuously without being manually triggered by the user. When it is determined that the lighting condition is undesirable, the display can be continuously adjusted according to the live image of the real-time video. For example, the screen brightness can be gradually increased until the palm region is bright enough.

Real-time feedback: in the present invention, the real-time feedback refers to the area on the display that is used to display guidance on palm placement, to view the real-time video of the palm, to indicate the current position of the detected palm, or to indicate the desired direction to move the palm. Feedback includes static visual cues, real-time video, dynamic visual cues, etc. These three components can be displayed alone or simultaneously. In the present invention the background and the real-time video can be displayed on different layers or in different areas of the screen depending on the requirements from the user or interface design.

The specific embodiments of the present invention will be described in detail below in conjunction with FIGS. 1-3

Embodiment One

FIG. 1 shows the workflow of palmprint recognition using the touchless palmprint acquisition method provided by the present invention. The processes include image acquisition, palm detection, image analysis and processing, and palmprint recognition.

The user places the palm in front of the terminal device (including but not limited to mobile phones, tablet computers and other portable devices) with a screen and a front-facing camera. The camera captures camera image 101 frame by frame to obtain the user's palmprint. The palm detection module 102 detects whether the palm is present (P103) in the camera image 101. If the palm is not present, the module reports no palm detected (P115). If the palm is present, the module locates the palm area by detecting the position and size of the palm inside the image (P104), provides feedback (P116) and determines whether the detected palm meet the requirements for palmprint recognition (P105). For instance, if part of the palm is missing from the image or the palm area does not contain enough resolution, the feedback on adjusting the palm position is provided (P117). If the requirements are satisfied, an image with the palm area labelled is generated (106) and passed to the image analysis and processing module 107.

In the above process, the touchless palmprint acquisition method provided by the present invention can be applied to terminal devices with a display screen and a front-facing camera. Without any additional hardware (including but not limited to an external infrared camera) palm detection can be performed by analyzing the image captured by the built-in front-facing camera in an open space without controlled lighting. Palm detection determines whether the palm is present in the camera image in real time. When the palm is present, its area in the camera image is accurately located and fed back to the user through the display in real time (P116). If the current palm position is undesirable (too far, or outside the camera field of view, etc.), a visual cue can be displayed to indicate the desired direction to move the palm to adjust its position (P117).

The workflow of the image analysis and processing module 107 is as follows: first, the image quality is analyzed (P108) to determine whether the palm-labelled image 106 meets the requirements of palmprint recognition, such as whether the grayscale intensity and/or contrast are sufficient. If not, the feedback on adjusting camera parameters is provided (P118). If yes, the module continues to perform image preprocessing (P109) that consists of operations including but not limited to noise removal and image enhancement. The output preprocessed image 110 is then transmitted to the palmprint recognition module 111, which consists of the palmprint registration module 112 and the palmprint matching module 113.

Palmprint registration module 112 performs palmprint registration. It creates a palmprint template 114 from the preprocessed image 110, saves the palmprint template 114 and reports a successful registration (P119). Palmprint matching module 113 verifies user identity by matching the palmprint template created from newly captured preprocessed image 110 with one or multiple palmprint templates 114 that have been registered in the system previously. Finally, the matching result is returned (120).

The various modules, processes and feedback of palmprint acquisition for palmprint recognition described above are only exemplary descriptions. Those skilled in the art may appropriately replace or remove certain steps as needed to achieve the same effect.

Embodiment Two

Figure 2:
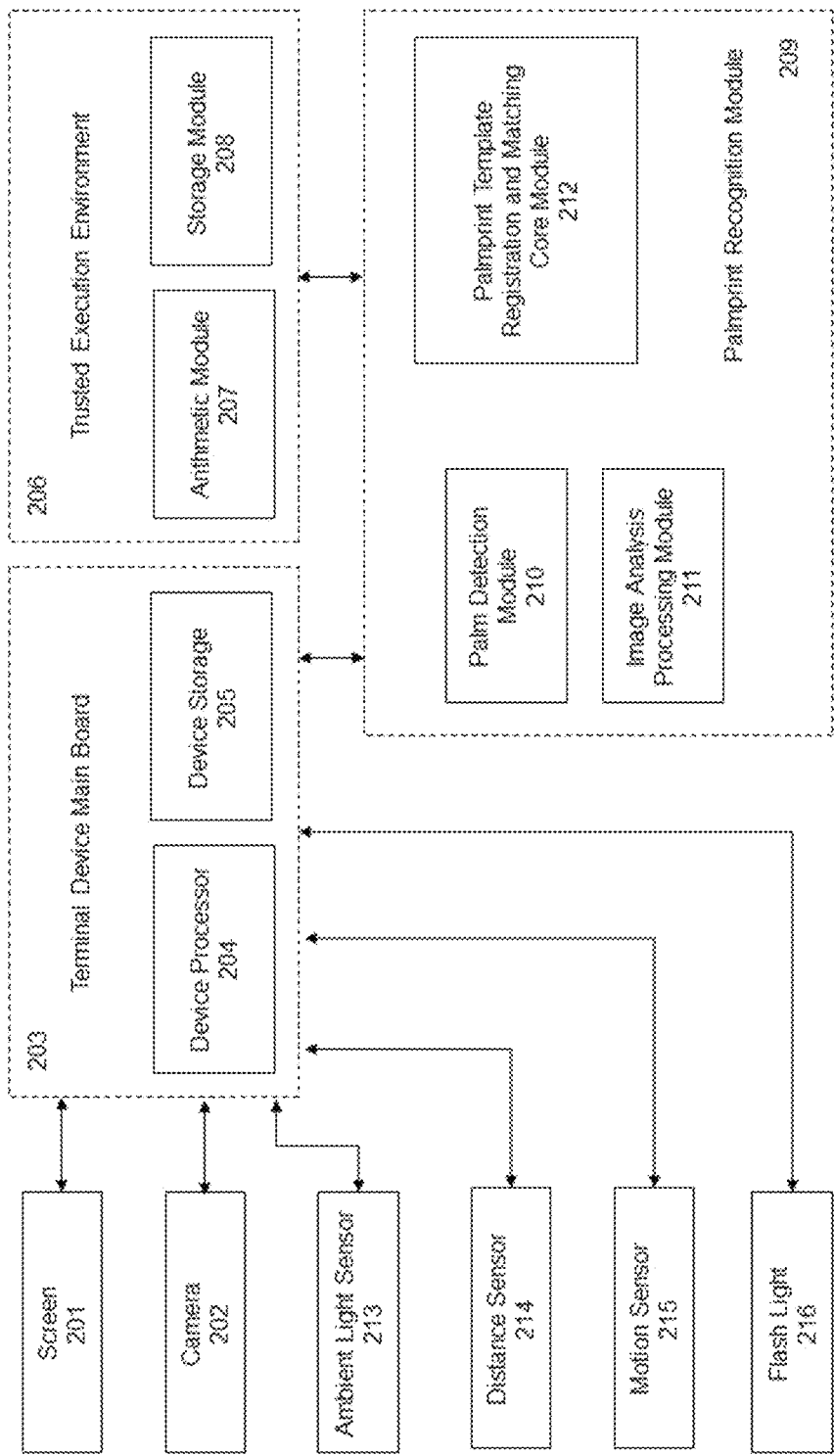
FIG. 2 shows a diagram of touchless palmprint acquisition on a terminal device.

FIG. 2 shows a diagram of touchless palmprint acquisition using a terminal device. The terminal device with a screen and a front-facing camera consists of: one or more screens 201, one or more cameras 202 for capturing images, a terminal device main board 203, a trusted execution environment 206. The terminal device main board 203 includes a device processor 204 and a device storage 205. The trusted execution environment 206 includes an arithmetic module 207 and a storage module 208.

Preferably, the terminal device with a screen and a front-facing camera may further comprise an ambient light sensor 213, a distance sensor 214, a motion sensor 215, and a flash light 216, wherein the ambient light sensor 213, the distance sensor 214, the motion sensor 215, the flash light 216 can all be connected to the device processor 204 (including but not limited to, central processing unit CPU and graphics processor GPU) through the terminal device main board 203, and the device storage 205 is used to store palmprint templates 114. The palmprint recognition module 209 runs on the terminal device main board 203 and includes a palm detection module 210, an image analysis and processing module 211, and a palmprint template registration and matching core module 212. The palmprint recognition module 209 is connected with peripheral hardware such as the camera 202 and screen 201. The palmprint recognition module 209 not only takes images and sensor inputs, but also controls and adjusts the parameters of peripheral hardware as well as feeds the processing results back to the user through the display screen.

Preferably, the distance between the palm and the camera can be measured by a distance sensor 214. When the measured distance is less than a preset threshold, due to the limited camera field of view, only part of the palm is contained in the image. In this case, the palm detection module 102 may not be called. Feedback can be displayed through the screen 201 to instruct the user to check the current position of the palm. If the palm is too close to or outside the camera field of view, the user can adjust the palm position so that the entire palm or the majority part of the palm is visible in the camera image.

The palmprint recognition module 209 is embedded in the device processor 204 and device storage 205 of the terminal device with a display and a front-facing camera.

Preferably, when a trusted execution environment 206 is available in the terminal device, palmprint template registration and matching core module 212 may run completely or partially in the trusted execution environment 206. In the present invention, when the lighting condition is undesirable, the brightness level of the screen 201 can be adjusted to be high enough and/or display a high-brightness background for light filling.

Embodiment Three

Figure 3:
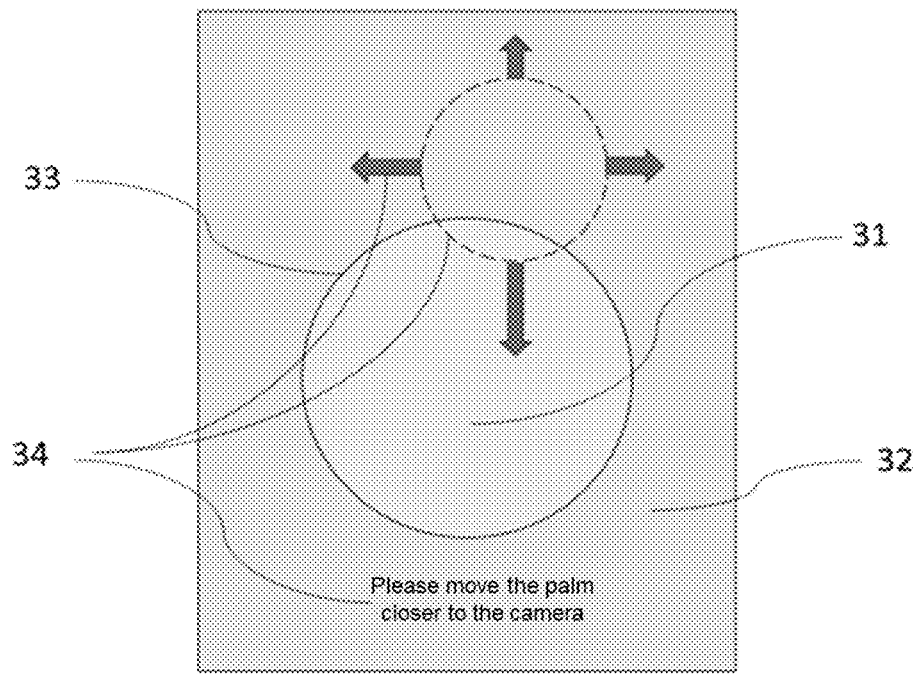
FIG. 3 illustrates a display screen used in an embodiment of the touchless palmprint acquisition method.

FIG. 3 illustrates a screen display used by the touchless palmprint acquisition method provided by the present invention. The screen 201 of the terminal device displays real-time feedback to the user to guide palm placement.

Figure 3A:
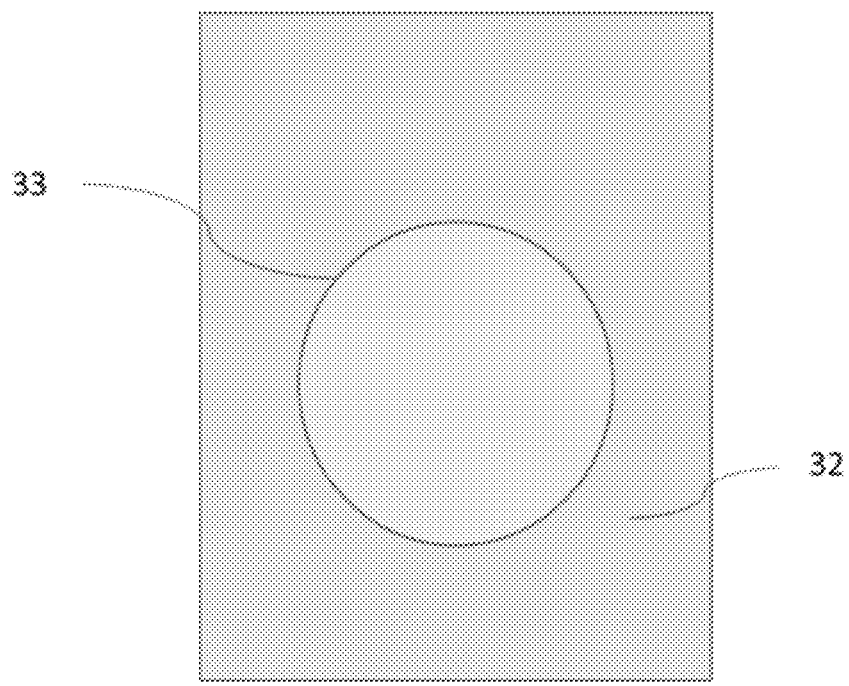
FIG. 3a illustrates one example of real-time feedback.

FIG. 3a shows an example of real-time feedback that includes a static visual cue 33 for guiding the user to place the palm at a suitable position. The static visual cue 33 can include but is not limited to arrows, wireframes, filled figures, text, etc. Preferably, the static visual cue 33 may be a palm-shaped frame, or a geometric frame such as a rectangle, circle, oval, etc. such that the user can adjust and place the palm within the displayed frame. Preferably, the static visual cue 33 may be a palm-shaped translucent filled image. Preferably, a text description can be displayed to instruct the user to use the border between the static visual cue 33 and the background 32 as a guide to place the palm inside the static visual cue 33, or make the borders of the palm and the static visual cue 33 substantially coincide.

Preferably, when the transparency of the background 32 is not uniform across different areas, the boundary of the changes in transparency can be used as a static visual cue 33. Preferably, the boundary of the changes of the transparency can be set as palm-shaped, rectangular, circular, elliptical, etc.

Figure 3B:
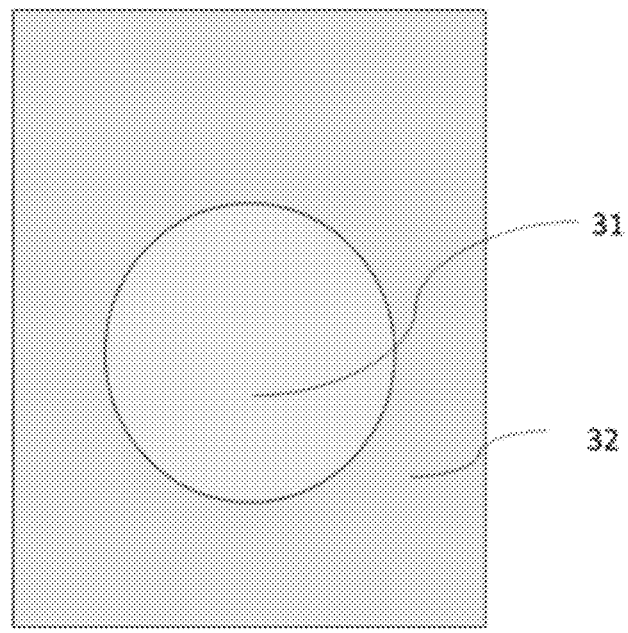
FIG. 3b illustrates the second example of real-time feedback.

FIG. 3b shows the second example of real-time feedback that includes a real-time video 31 displaying the whole or certain subareas of the images obtained by the front-facing camera. The user may use the real-time video 31 as feedback and together with static visual cue 33 to place the palm in a suitable position. Preferably, the background 32 is set to be translucent and be placed in front of the real-time video 31. The transparency of the background 32 may or may not be uniform in different areas.

Figure 3C:
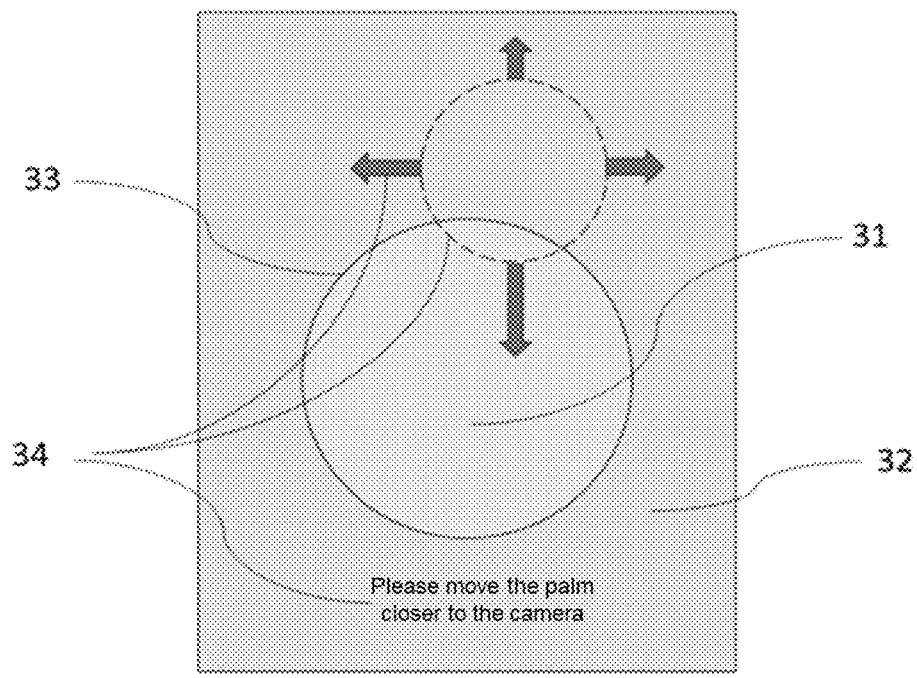
FIG. 3c illustrates the third example of real-time feedback.

FIG. 3c shows the third example of real-time feedback that includes one or multiple dynamic visual cues 34 for guiding the positioning and/or the desired direction to move the palm. The dynamic visual cues 34 include but are not limited to arrows, wireframes, filled maps, and/or texts.

Preferably, the dynamic visual cue 34 may include a palm-shaped frame, or a geometric-shaped frame (including but not limited to a rectangle, a circle, an ellipse, etc.). The dynamic visual cue can prompt the user whether the palm is detected, and if yes, the position of the detected palm.

Preferably, the dynamic visual 34 may include a translucent filled image that is palm-shaped or geometric-shaped (including but not limited to rectangular, circular, elliptical, etc.). The dynamic visual cue can prompt the user whether the palm is detected, and if yes, the position of the detected palm.

Preferably, the dynamic visual cue 34 may include an arrow or an arrow animation for guiding the user to move the palm in a specific direction, and/or the distance to be moved.

Preferably, the dynamic visual cue 34 may include a text description for guiding the user to move the palm in a specific direction, and/or the distance to be moved. For example, the text can prompt the user to "please move the palm closer to the camera".

Preferably, the transparency of the background 32 and the real-time video area can be set to 0 and 1 respectively, i.e., the screen displays a high-brightness background in most areas, and displays the real-time video 31 in openings that are fully transparent. At the same time, the boundary of the above-mentioned opening (fully transparent area) can be used as a static visual cue 33 for guiding the user to place the palm.

Preferably, the background 32 is arranged in a grid format with interleaving transparent and opaque areas. The real-time video 31 is displayed through the transparent areas of the grid.

Embodiment Four

On a terminal device that uses the palmprint acquisition method provided by the present invention, if the light intensity of the environment is sufficient, the front-facing camera directly acquires the palmprint image. If the light intensity of the environment is insufficient and/or if there is directional light coming from the back or side of the palm which makes the lighting condition in the palm area undesirable, the captured camera image will have a low grayscale intensity or low contrast inside the palm area, and therefore will not meet the requirements of palmprint recognition. In this case, the screen 201 changes its display and use the screen light to improve the lighting conditions in the palm area in order to increase the recognizability of the palmprints.

The present invention exemplarily provides the following scenarios on how to determine whether the lighting condition is undesirable:

(a) The terminal device is equipped with an ambient light sensor. When the light intensity of the environment measured by the ambient light sensor is lower than or equal to a first preset value, it is determined that the lighting condition is undesirable;

(b) The image analysis and processing module 107 analyzes the grayscale intensity of the captured camera image in the palm area. When the grayscale intensity is lower than or equal to a second preset value, it is determined that the lighting condition is undesirable; or (c) The image analysis and processing module 107 analyzes the contrast of the captured camera image in the palm area. When the contrast is lower than or equal to a third preset value, it is determined that the lighting condition is undesirable.

When any of the above situations occurs, the lighting condition is undesirable for palmprint recognition. To improve the lighting condition, the brightness level of the screen 201 can be tuned higher, and a high-brightness background can be displayed, or a blue or purple background can be displayed for supplementary lighting. Preferably, the background 32 may be set to blue, that is, the light emitted by the screen is mainly in the blue spectrum. When palm is illuminated by blue light, its palmprint texture has a higher contrast in the camera image.

Compared with the prior art, the touchless palmprint acquisition device and method presented in this invention have the following advantages:

(1) The palmprint acquisition method of the present invention can be customized into an independent touchless palmprint recognition device, which is directly applicable to a terminal device using the built-in display screen, camera, ambient light sensor, distance sensors, processor chips etc. The hardware realizes palmprint detection, acquisition, identification, matching and feedback, and depending on the lighting condition, can provide supplementary lighting using the terminal device's own display screen;

(2) The palmprint acquisition method of the present invention facilitates a better human-computer interaction. The screen has areas to display the palmprint image captured by the front-facing camera in real time, as well as static and/or dynamic visual cues to guide the user to adjust palm position, distance or posture.

(3) The palmprint acquisition method of the present invention adopts a variety of ways to change the display of the screen. Using the display screen as a supplementary light source, the lighting condition of the palm area will be improved and the recognizability of the palmprint will be increased.

(4) The palmprint acquisition method of the present invention makes the identification process more efficient, easier to operate, and lowers the requirements on the lighting environment. It is applicable to not only authentication and identification on a personal mobile device, but also to multi-person authentication on a terminal in public places.

Unless otherwise specified, the qualifiers similar to "first" and "second" in this article do not refer to chronological order, quantity, or importance, but are merely intended to distinguish one feature of the present technical solution from another feature of the present technical solution. Similarly, the qualifiers similar to "one" in this article do not refer to the number, but describe a technical feature that has not appeared in the foregoing.

While certain embodiments of the invention have been described herein in detail for purposes of clarity and understanding, the foregoing description and figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. A method for touchless acquisition of a palmprint using a terminal device with a display screen and a front-facing camera, comprising the steps of:
   displaying a static visual cue on the display screen with which a user is prompted to align an image of the user's palm, the static visual cue formed from a boundary of a change in color and/or transparency of a display screen image;
   capturing palm images using the front-facing camera;
   displaying a dynamic visual cue on the display screen, corresponding to a detected position of a user's palm in the palm images, the dynamic visual cue forming an area with a change in color and/or transparency of the display screen image relative to portions of the display screen outside the dynamic visual cue; and
   when a lighting condition is undesirable, changing the display on portions of the display screen outside the static visual cue and dynamic visual cue as a supplementary light source to improve the lighting condition in a palm area in order to increase the recognizability of the palmprint;
wherein the step of changing the display comprises one or multiple of the following:
(1) displaying a high-brightness background; and/or
(2) displaying a blue or purple background.

2. The method of claim 1, further comprising displaying real-time feedback on the screen of the terminal device to guide the user to place the palm in a suitable position.

3. The method of claim 1, further comprising determining whether the lighting condition in the palm area is undesirable using one or more of the criteria as follows:
(a) using a built-in ambient light sensor of the terminal device to measure the light intensity of the environment whereby when the measured light intensity is lower than or equal to a first preset value, it is determined that the lighting condition is undesirable;
(b) analyzing the grayscale intensity of the captured image inside the palm area, whereby when the intensity is lower than or equal to a second preset value, it is determined that the lighting condition is undesirable;
(c) analyzing the image contrast of the captured image inside the palm area, whereby when the contrast is lower than or equal to a third preset value, it is determined that the lighting condition is undesirable.

4. The method of claim 2, further comprising displaying a background simultaneously with the real-time feedback but on a different layer or in different subareas of the display screen.

5. The method of claim 2, wherein the real-time feedback comprises
a real-time video displaying the subareas of the video captured by the front-facing camera corresponding to areas within the static visual cue and/or dynamic visual cue.

6. The method of claim 1, wherein the static visual cue and the dynamic visual cue each consist of one or more of: arrows, wireframes, filled figures and text.

7. The method of claim 1, in which the step of displaying a dynamic visual cue comprises: detecting whether a palm is present in the captured palm image, and if so, locating a detected palm area in the image, and visualizing the detected palm area as a dynamic visual cue on the screen.

8. The method of claim 5, wherein the step of changing the display on portions of the display screen outside the static visual cue and variable positioning cue comprises setting a background to be translucent and placed in front of real-time video captured by the camera corresponding to areas outside of the static visual cue and dynamic visual cue.

9. The method of claim 4, wherein a border between the background and the real-time video is used as the static visual cue.

10. A method for touchless acquisition of facial images using a terminal device with a display screen and a front-facing camera, comprising the steps of:
displaying a static visual cue on the display screen with which a user is prompted to align an image of the user's face, the static visual cue formed from a boundary of a change in color and/or transparency of a display screen image;
capturing facial images using the front-facing camera;
displaying a dynamic visual cue on the display screen, corresponding to a detected position of a user's face in the facial images, the dynamic visual cue forming an area with a change in color and/or transparency of the display screen image relative to portions of the display screen outside the dynamic visual cue; and
when a lighting condition is undesirable, changing the display on portions of the display screen outside the static visual cue and dynamic visual cue as a supplementary light source to improve the lighting condition in a face area in order to increase the recognizability of the facial image;
wherein the step of changing the display comprises one or more of the following:
(1) displaying a high-brightness background; and/or
(2) displaying a blue or purple background.

11. A method for touchless acquisition of eye pattern images using a terminal device with a display screen and a front-facing camera, comprising the steps of:
displaying a static visual cue on the display screen with which a user is prompted to align an image of the user's eye, the static visual cue formed from a boundary of a change in color and/or transparency of a display screen image;
capturing eye pattern images using the front-facing camera;
displaying a dynamic visual cue on the display screen, corresponding to a detected position of a user's eye in the eye pattern images, the dynamic visual cue forming an area with a change in color and/or transparency of the display screen image relative to portions of the display screen outside the dynamic visual cue; and
when a lighting condition is undesirable, changing the display on portions of the display screen outside the static visual cue and dynamic visual cue as a supplementary light source to improve the lighting condition in an eye area in order to increase the recognizability of the eye pattern image;
wherein the step of changing the display comprises one or more of the following:
(1) displaying a high-brightness background; and/or
(2) displaying a blue or purple background.

12. A device for touchless acquisition of a palmprint comprising a terminal device with a display screen and a front-facing camera, wherein:
the terminal is configured to display on the display screen a static visual cue with which a user is prompted to align an image of the user's palm, the static visual cue formed from a boundary of a change in color and/or transparency of a display screen image;
the front-facing camera is used to capture palm images of a palm and display on the display screen a dynamic visual cue corresponding to a detected position of the palm in the palm images; and
the screen configured to adjust portions of a display thereon outside of the static visual cue and dynamic visual cue when a lighting condition is undesirable to improve the lighting condition of a palm area in order to increase recognizability of the palmprint within the palm images, by
displaying a high-brightness background; and/or
(2) displaying a blue or purple background.

13. The device of claim 12, further comprising a distance sensor that measures a distance between the palm and the front-facing camera.

* * * * *